US012608616B2

(12) United States Patent
Shazeer

(10) Patent No.: US 12,608,616 B2
(45) Date of Patent: *Apr. 21, 2026

(54) ATTENTION NEURAL NETWORKS WITH LINEAR UNITS

(71) Applicant: Google LLC, Mountain View, CA (US)

(72) Inventor: Noam M. Shazeer, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/360,280

(22) Filed: Oct. 16, 2025

(65) Prior Publication Data

US 2026/0044738 A1 Feb. 12, 2026

Related U.S. Application Data

(63) Continuation of application No. 19/052,151, filed on Feb. 12, 2025, which is a continuation of application No. 17/175,567, filed on Feb. 12, 2021, now Pat. No. 12,254,411.

(60) Provisional application No. 62/975,707, filed on Feb. 12, 2020.

(51) Int. Cl.
| | |
|---|---|
| *G06N 3/08* | (2023.01) |
| *G06N 3/048* | (2023.01) |
| *G06N 3/082* | (2023.01) |

(52) U.S. Cl.
CPC ............. *G06N 3/082* (2013.01); *G06N 3/048* (2023.01)

(58) Field of Classification Search
CPC ........ G06N 3/082; G06N 3/048; G06N 3/045; G06N 3/088; G06N 3/084
See application file for complete search history.

(56) References Cited

U.S. PATENT DOCUMENTS

| | | | | |
|---|---|---|---|---|
| 2018/0261214 | A1* | 9/2018 | Gehring | G06N 3/04 |
| 2018/0341860 | A1* | 11/2018 | Shazeer | G06N 3/045 |
| 2020/0258496 | A1* | 8/2020 | Yang | G06N 3/044 |

OTHER PUBLICATIONS

Medina, "Parallel Attention Mechanisms in Neural Machine Translation", 2018 17th IEEE International Conference on Machine Learning and Applications. (Previously supplied). (Year: 2018).*
Sukhbaatar, "Augmenting Self-attention with Persistent Memory", 2019. (Previously supplied). (Year: 2019).*
Gehring, "Convolutional Sequence to Sequence Learning", Proceedings of the 34th International Conference on Machine Learning, Sydney, Australia, PMLR 70, 2017. (Previously supplied). (Year: 2017).*

(Continued)

*Primary Examiner* — Dave Misir
(74) *Attorney, Agent, or Firm* — Fish & Richardson P.C.

(57) ABSTRACT

Methods, systems, and apparatus, including computer programs encoded on a computer storage medium, for performing a machine learning task on a network input to generate a network output. In one aspect, one of the systems includes an attention neural network configured to perform the machine learning task, the attention neural network including one or more attention layers, each attention layer comprising an attention sub-layer and a feed-forward sub-layer that applies an element-wise multiplication between two vectors generated as a result of two different linear transformations performed on the same attended layer input.

21 Claims, 3 Drawing Sheets

(56)                        References Cited

OTHER PUBLICATIONS

Dai et al., "Transformer-xl: Attentive language models beyond a fixed-length context," arXiv preprint arXiv:1901.02860, Jan. 2019, 20 pages.

Dauphin et al., "Language modeling with gated convolutional networks," International conference on machine learning, Jul. 2017, pp. 933-941.

Devlin et al., "Bert: Pre-training of deep bidirectional transformers for language understanding," arXiv preprint arXiv:1810.04805, Oct. 2018, 16 pages.

Gehring, "Convolutional Sequence to Sequence Learning", Proceedings of the 34th International Conference on Machine Learning, Sydney, Australia, PMLR70, 2017. (Year: 2017).

Glorot et al., "Deep sparse rectifier neural networks," Proceedings of the fourteenth international conference on artificial intelligence and statistics, Jun. 2011, pp. 315-323.

Hendrycks et al., "Gaussian error linear units (gelus)," arXiv preprint arXiv:1606.08415, Jun. 2016, 9 pages.

Kitaev et al., "Reformer: The efficient transformer," arXiv preprint arXiv:2001.04451, Jan. 2020, 12 pages.

Medina, "Parallel Attention Mechanisms in Neural Machine Translation", 2018 17th IEEE International Conference on Machine Learning and Applications. (Year: 2018).

Mnih et al., "Three new graphical models for statistical language modelling," Proceedings of the 24th international conference on Machine learning, Jun. 2007, pp. 641-648.

Raffel et al., "Exploring the limits of transfer learning with a unified text-to-text transformer," arXiv preprint arXiv:1910.10683, Oct. 2019, 67 pages.

Rajpurkar et al., "Squad: 100,000+ questions for machine comprehension of text," arXiv preprint arXiv:1606.05250, Jun. 2016, 10 pages.

Ramachandran et al., "Searching for activation functions," arXiv preprint arXiv:1710.05941, Oct. 2017, 13 pages.

Shazeer et al., "Adafactor: Adaptive learning rates with sublinear memory cost," International Conference on Machine Learning, Jul. 2018, pp. 4596-4604.

Sukhbaatar, "Augmenting Self-attention with Persistent Memory", 2019. (Year: 2019).

Vaswani et al., "Attention is all you need," arXiv preprint arXiv:1706.03762, Jun. 2017, 15 pages.

Wang et al., "Glue: A multi-task benchmark and analysis platform for natural language understanding," arXiv preprint arXiv:1804.07461, Apr. 2018, 20 pages.

Wang et al., "Superglue: A stickier benchmark for general-purpose language understanding systems," arXiv preprint arXiv:1905.00537, May 2019, 29 pages.

* cited by examiner

ATTENTION NEURAL NETWORKS WITH LINEAR UNITS

CROSS-REFERENCE TO RELATED APPLICATIONS

This application is a continuation of U.S. application Ser. No. 19/052,151, filed on Feb. 12, 2025, which is a continuation of U.S. application Ser. No. 17/175,567, filed on Feb. 12, 2021, now U.S. Pat. No. 12,254,411, which claims priority to U.S. Provisional Application No. 62/975,707, filed on Feb. 12, 2020. The disclosures of the prior applications are considered part of and are incorporated by reference in the disclosure of this application.

BACKGROUND

This specification relates to performing a machine learning task on a network input using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that performs a machine learning task on a network input using an attention neural network that includes feed-forward sub-layers that apply linear units to their inputs.

Particular embodiments of the subject matter described in this specification can be implemented so as to realize one or more of the following advantages.

The techniques described in this specification allow a neural network system to process input sequences, generate output sequences, or both more accurately than existing attention-based networks by using a new feed-forward sub-layer, i.e., relative to conventional attention-based neural networks. In more detail, by using a feed-forward sub-layer that computes an element-wise product between vectors derived from the outputs of two different linear transformations (in place of, e.g., a single linear transformation followed by an activation function), the described attention neural networks can achieve improved performance on a variety of tasks, including tasks that leverage unsupervised pre-training in order to improve performance on supervised downstream tasks with limited available training data.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
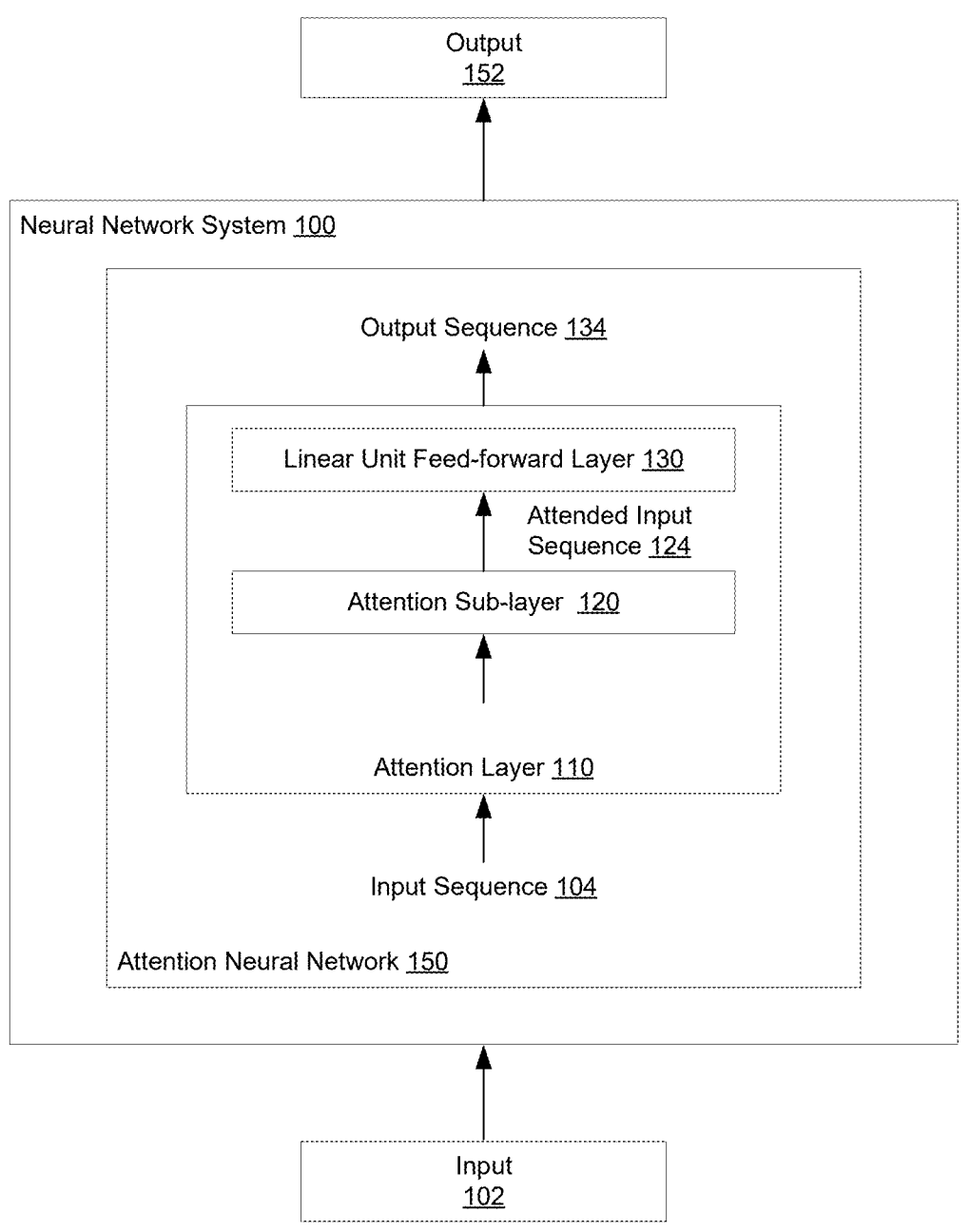
FIG. 1 shows an example neural network system.

This specification describes a system implemented as computer programs on one or more computers in one or more locations that performs a machine learning task on a network input to generate network output for the machine learning task.

The machine learning task can be any machine learning task that (i) operates on a network input that is an input sequence, (ii) generates a network output that is an output sequence, or (iii) both.

Some examples of machine learning tasks that the system can be configured to perform follow.

As one example, the task may be a neural machine translation task. For example, if the input to the neural network is a sequence of text, e.g., a sequence of words, phrases, characters, or word pieces, in one language, the output generated by the neural network may be a translation of the sequence of text into another language, i.e., a sequence of text in the other language that is a translation of the input sequence of text. As a particular example, the task may be a multi-lingual machine translation task, where a single neural network is configured to translate between multiple different source language-target language pairs. In this example, the source language text may be augmented with an identifier that indicates the target language into which the neural network should translate the source language text.

As another example, the task may be an audio processing task. For example, if the input to the neural network is a sequence representing a spoken utterance, the output generated by the neural network may be a score for each of a set of pieces of text, each score representing an estimated likelihood that the piece of text is the correct transcript for the utterance. As another example, if the input to the neural network is a sequence representing a spoken utterance, the output generated by the neural network can indicate whether a particular word or phrase ("hotword") was spoken in the utterance. As another example, if the input to the neural network is a sequence representing a spoken utterance, the output generated by the neural network can identify the natural language in which the utterance was spoken.

As another example, the task can be a natural language processing or understanding task, e.g., an entailment task, a paraphrase task, a textual similarity task, a sentiment task, a sentence completion task, a grammaticality task, and so on, that operates on a sequence of text in some natural language.

As another example, the task can be a text to speech task, where the input is text in a natural language or features of text in a natural language and the network output is a spectrogram, a waveform, or other data defining audio of the text being spoken in the natural language.

As another example, the task can be a health prediction task, where the input is a sequence derived from electronic health record data for a patient and the output is a prediction that is relevant to the future health of the patient, e.g., a predicted treatment that should be prescribed to the patient, the likelihood that an adverse health event will occur to the patient, or a predicted diagnosis for the patient.

As another example, the task can be a text generation task, where the input is a sequence of text, and the output is another sequence of text, e.g., a completion of the input sequence of text, a response to a question posed in the input sequence, or a sequence of text that is about a topic specified by the first sequence of text. As another example, the input to the text generation task can be an input other than text, e.g., an image, and the output sequence can be text that describes the input.

As another example, the task can be an image generation task, where the input is a conditioning input and the output is a sequence of intensity value inputs for the pixels of an image.

As another example, the task can be an agent control task, where the input is a sequence of observations or other data characterizing states of an environment and the output defines an action to be performed by the agent in response to the most recent data in the sequence. The agent can be, e.g., a real-world or simulated robot, a control system for an industrial facility, or a control system that controls a different kind of agent.

As another example, the task can be a genomics task, where the input is a sequence representing a fragment of a DNA sequence or other molecule sequence and the output is either an embedding of the fragment for use in a downstream task, e.g., by making use of an unsupervised learning technique on a data set of DNA sequence fragments, or an output for the downstream task. Examples of downstream tasks include promoter site prediction, methylation analysis, predicting functional effects of non-coding variants, and so on.

In some cases, the machine learning task is a combination of multiple individual machine learning tasks, i.e., the system is configured to perform multiple different individual machine learning tasks, e.g., two or more of the machine learning tasks mentioned above. For example, the system can be configured to perform multiple individual natural language understanding tasks, with the network input including an identifier for the individual natural language understanding task to be performed on the network input.

To perform the machine learning task, the system includes an attention neural network that includes multiple attention layers. Each layer operates on a respective input sequence that includes a respective layer input at each of one or more positions.

Moreover, each of the layers includes an attention sub-layer and a feed-forward sub-layer. The attention sub-layer receives the input sequence for the layer and applies an attention mechanism on the input sequence for the layer to generate an attended input sequence. The attention mechanism applied by the attention layer depends on the configuration of the attention neural network, as will be described in more detail below. The feed-forward sub-layer then operates on the attended input sequence to generate an output sequence for the layer.

Generally, the layers within the attention neural network can be arranged in any of a variety of configurations.

As one example, when the network input is an input sequence, the attention neural network includes an encoder neural network that includes a subset of the plurality of layers and that encodes the input sequence to generate a respective encoded representation of each input in the sequence. In this example, the attention mechanism applied by the layers in the encoder is a self-attention mechanism, e.g., a multi-head self-attention mechanism.

As another example, the attention neural network includes a decoder neural network that includes a different subset of the plurality of layers and that processes either the network input or the encoded representation of the network input to generate the network output. In some of these examples, when the network output is an output sequence the decoder neural network operates auto-regressively and the attention sub-layers within some or all of the layers of the decoder apply masked self-attention over the partially generated output sequence. When the neural network includes both an encoder and a decoder, some of the layers in the decoder apply cross-attention into the encoded representations while others apply self-attention over the output sequence, either masked or not masked. When the attention neural network includes a decoder neural network that operates directly on the input sequence, the attention layers within the decoder can apply a self-attention mechanism over the input sequence.

The specifics of the operation of the attention layers within the decoder neural network and the encoder neural network are described in more detail in Vaswani, et al, attention Is All You Need, arXiv:1706.03762, and Raffel, et al, Exploring the Limits of Transfer Learning with a Unified Text-to-Text Transformer, arXiv:1910.10683, and Devlin et al, *BERT: Pre-training of Deep Bidirectional Transformers for Language Understanding*, arXiv:1810.04805, the entire contents of which are hereby incorporated by reference herein in their entirety.

FIG. 1 shows an example neural network system 100. The neural network system 100 is an example of a system implemented as computer programs on one or more computers in one or more locations, in which the systems, components, and techniques described below can be implemented.

The neural network system 100 can receive an input 102 and perform a machine learning task on the input 102 to generate an output 152.

As described above, the neural network system 100 can perform any of a variety of tasks that involves (i) operating on an input 102 that is an input sequence, (ii) generating an output 152 that is an output sequence, or (iii) both.

The neural network system 100 includes an attention neural network 150 that includes multiple attention layers 110.

Each attention layer 110 operates on an input sequence 104 and generates a corresponding output sequence 134.

Although one attention layer is depicted in FIG. 1 for convenience, as described above, the attention neural network 150 generally includes many other layers, including, for example, embedding layers, output layer, and other attention layers.

Specifically, the input sequence 104 has a respective input at each of one or more input positions in an input order and the output sequence 134 has a respective output at each of one or more output positions in an output order. That is, the input sequence 102 has one or more inputs arranged according to an input order and the output sequence 134 has one or more outputs arranged according to an output order.

In general, the input sequence 104 can be any intermediate sequential data generated by the attention neural network 150 when performing the machine learning task on the input 102. For example, the input sequence 104 can be embedded (i.e., numeric) representations of the system input 102 generated by an embedding layer. As another example, the input sequence 104 can be an output sequence generated by a preceding attention layer or other layer in the attention neural network 150. As another example, when the neural network 150 generates the network output auto-regressively, the input sequence 140 can be embedded representations of the currently generated network output as of the current time step.

To generate the output sequence 134 from the input sequence 104, each attention layer 110 includes an attention sub-layer 120 and a linear unit feed-forward sub-layer 130.

The attention sub-layer 120 receives the input sequence 104 for the layer 110 and applies an attention mechanism on the input sequence for the layer to generate an attended input sequence 124.

Generally, to apply the attention mechanism, the sub-layer 120 uses one or more attention heads. Each attention head generates a set of queries, a set of keys, and a set of values, and then applies any of a variety of variants of query-key-value (QKV) attention using the queries, keys, and values to generate an output. When there are multiple attention heads, the sub-layer 120 then combines the outputs of the multiple attention heads, e.g., by concatenating the outputs and, optionally, processing the concatenated outputs through a linear layer. Examples of QKV attention variants are described in Vaswani, et al, *Attention Is All You Need*, arXiv:1706.03762, Raffel, et al, *Exploring the Limits of Transfer Learning with a Unified Text-to-Text Transformer*, arXiv:1910.10683, Devlin et al, *BERT: Pre-training of Deep Bidirectional Transformers for Language Understanding*, arXiv:1810.04805, Dai, et al, *Transformer-XL: Attentive Language Models Beyond a Fixed-Length Context*, arXiv: 1901.02860, and Kitaev, et al, *Reformer: The Efficient Transformer*, arXiv: 2001.04451, the entire contents of which are hereby incorporated by reference herein in their entirety.

In some cases, the attended input sequence 124 is the final output of the attention mechanism. In some other cases, the sub-layer 120 applies one or more other operations, e.g., residual connections, layer normalization, or both, to the final output to generate the sequence 124.

The feed-forward sub-layer 130 then operates on the attended input sequence 124 to generate an output sequence 134 for the layer 110.

Generally, the layers within the attention neural network can be arranged in any of a variety of configurations.

The attention mechanism applied by the attention sub-layer 120 depends on the configuration of the attention neural network 150.

As one example, when the network input is an input sequence, the attention neural network 150 includes an encoder neural network that includes a subset of the plurality of layers and that encodes the input sequence to generate a respective encoded representation of each input in the sequence. In this example, the attention mechanism applied by the attention sub-layers 120 in the encoder is a self-attention mechanism, e.g., a multi-head self-attention mechanism, where the queries, keys, and values are all generated from the input sequence to the attention sub-layer.

As another example, the attention neural network 150 includes a decoder neural network that includes a different subset of the plurality of layers and that processes either the network input or the encoded representation of the network input to generate the network output. In some of these examples, when the network output is an output sequence, the decoder neural network operates auto-regressively and the attention sub-layers 120 within some or all of the layers of the decoder apply masked self-attention over the partially generated output sequence, where the queries, keys, and values are all generated from the input sequence to the attention sub-layer 120.

When the neural network 150 includes both an encoder and a decoder, some of the layers in the decoder apply cross-attention into the encoded representations while others apply self-attention over the output sequence, either masked or not masked. In cross-attention, the queries are generated from the input sequence to the attention sub-layer 120 while the keys and values are generated from the encoded representations of the network input.

When the attention neural network 150 includes a decoder neural network that operates directly on the input sequence, the attention sub-layers 120 within the decoder can apply a self-attention mechanism over the input sequence.

As used in this specification, the term "learned" means that an operation or a value has been adjusted during the training of the attention neural network 150.

Each feed-forward sub-layer 130 is configured to operate on each position in the attended input sequence 124 separately, i.e., in a position-wise manner. In particular, for each input position, the feed-forward sub-layer 130 is configured receive an attended layer input at the input position and apply a set of transformations to the attended layer input at the input position to generate an output for the input position. The transformations applied by the sub-layer 130 will generally be the same for each input position (but different feed-forward sub-layers in the attention neural network 150 will apply different transformations).

In conventional attention neural networks, the sequence of transformations generally include one linear transformation applied to a given attended layer input, followed by an activation function, e.g., a non-linear elementwise activation function, e.g., a ReLU activation function, and then followed by another linear transformation.

In the described attention neural network 150, however, the feed-forward sub-layers 130 apply a different set of transformations, as described below with reference to FIGS. 2 and 3.

Figure 2:
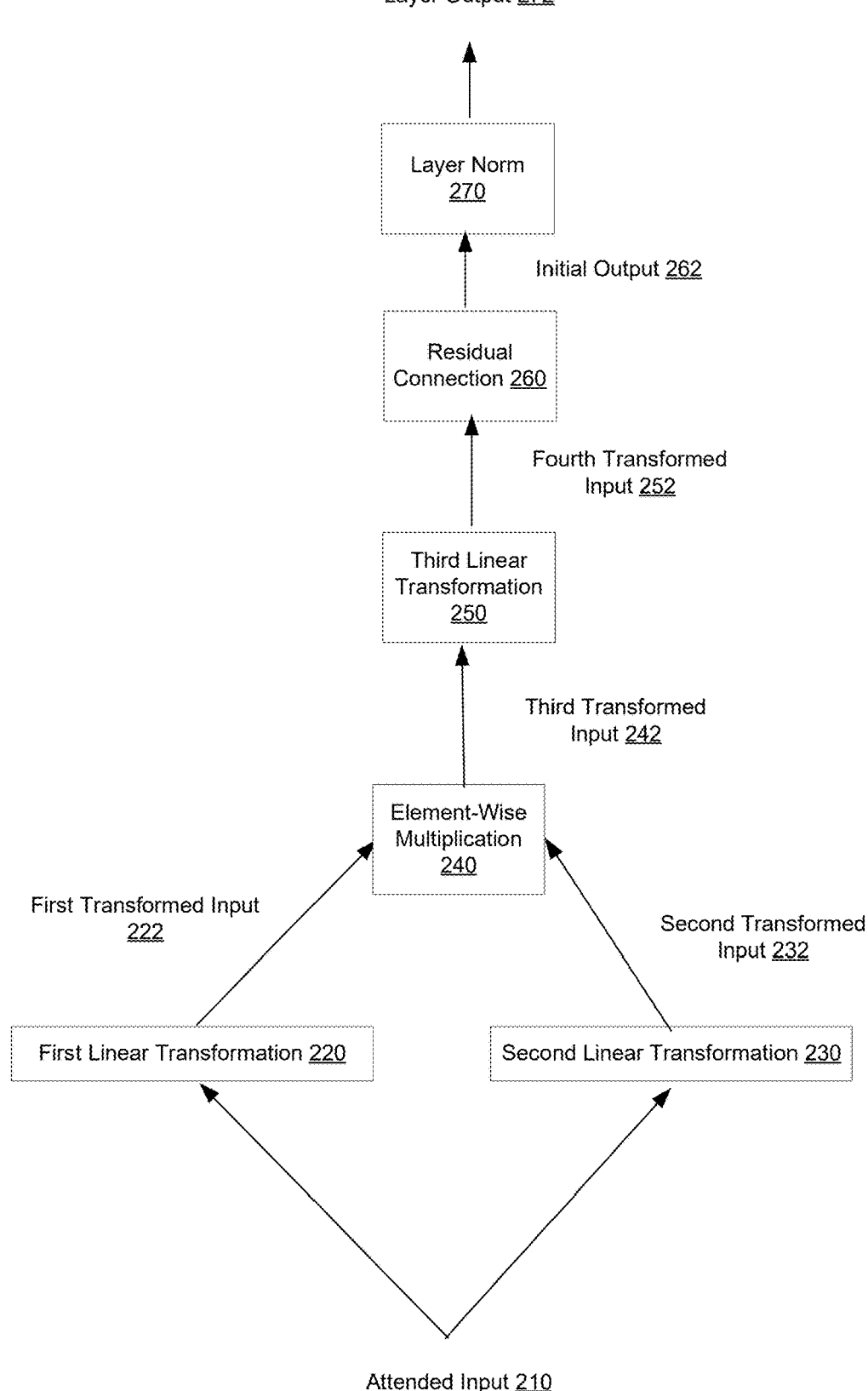
FIG. 2 shows an example of the operations performed by the feed-forward sub-layer of an attention layer.

FIG. 2 shows the operations performed by the feed-forward sub-layer 130 for a given attended input 210 at a given position in the attended input sequence generated by the attention sub-layer 120. The feed-forward sub-layer 130 can perform these operations, e.g., in parallel, for each attended input to generate the layer output for the attention layer 110.

In particular, the feed-forward sub-layer 130 generates a first transformed input 222 by applying a first linear transformation 220 to the attended layer input 210. In particular, the sub-layer 130 multiplies the attended layer input 210 by a first weight matrix to generate a product and, optionally, adds a first bias to the product to generate the output of the first linear transformation 220. The sub-layer 130 uses the same first weight matrix and (when used) the same first bias for all of the attended layer inputs. In other words, during training, the system 100 constrains the weight matrices and (when used) the biases to be the same for all of the positions in the attended layer sequences.

In some implementations, the output of the first linear transformation 220 is the first transformed input 222.

In some other implementations, the sub-layer 130 applies a non-linear activation function to the output of the first linear transformation 220 to generate the first transformed input 222.

In some of these implementations, the activation function is a rectified linear unit (ReLU) activation function. ReLUs are described in more detail in Xavier Glorot, Antoine Bordes, and Yoshua Bengio. Deep sparse rectifier neural networks. In Proceedings of the fourteenth international conference on artificial intelligence and statistics, pages 315-323, 2011, the entire contents of which are incorporated by reference herein.

In others of these implementations, the activation function is a sigmoid activation function.

In yet others of these implementations, the activation function is a Gaussian Error Linear Units activation function. GELUs are described in more detail in Dan Hendrycks and Kevin Gimpel. Bridging nonlinearities and stochastic regularizers with gaussian error linear units. CoRR, abs/1606.08415, 2016. arXiv preprint arXiv:1606.08415, the entire contents of which are incorporated by reference herein.

In yet others of these implementations, the activation function is a Swish activation function. Swish activation functions are described in Prajit Ramachandran, Barret Zoph, and Quoc V Le. Searching for activation functions. arXiv preprint arXiv:1710.05941, 2017, the entire contents of which are incorporated by reference herein.

The sub-layer 130 generates a second transformed input 232 by applying a second linear transformation 230 to the attended layer input at the position. In particular, the sub-layer 130 multiplies the attended layer input 210 by a second weight matrix to generate a product and, optionally, adds a second bias to the product to generate the second transformed input 232. As with the first linear transformation, the sub-layer 130 uses the same second weight matrix and (when used) the same second bias for all of the attended layer inputs. In other words, during training, the system 100 constrains the weight matrices and (when used) the biases to be the same for all of the positions in the attended layer sequences.

Thus, the sub-layer 130 applies two different learned linear transformations to the same attended layer input 210 to generate two different transformed inputs 222 and 232.

The sub-layer 130 then generates a third transformed input 242 by performing an element-wise multiplication 240 between the first transformed input and the second transformed input. An element-wise multiplication between two vectors of the same dimensionality generates an output vector that also has the same dimensionality by multiplying each element of one vector with the corresponding element from the other vector.

Thus, unlike a conventional sub-layer in a conventional attention neural network, the sub-layer 130 performs an element-wise product between the outputs of two different linear transformations on the same attended layer input. This results in improved performance, e.g., because the sub-layer 130 can leverage the information from two different learned transformations applied to the same attended layer input instead of applying learned transformation in sequence.

The sub-layer 130 applies a third linear transformation 250 to the third transformed input 242 to generate a fourth transformed input 252. In particular, the sub-layer 130 multiplies the third transformed input 242 by a third weight matrix to generate a product and, optionally, adds a third bias to the product to generate the fourth transformed input 252. As with the first and second linear transformations, the sub-layer 130 uses the same third weight matrix and (when used) the same third bias for all of the attended layer inputs. In other words, during training, the system 100 constrains the weight matrices and (when used) the biases to be the same for all of the positions in the attended layer sequences.

The first linear transformation 220, the second linear transformation 230, and the third linear transformation 250 will generally all be different from one another. In other words, although the weight matrices for the weight matrices for all three transformation will have the same dimensionality, the system 100 learns different values for the weights in the matrices during the training of the attention neural network 110.

The sub-layer 130 then generates the layer output 272 at the position from the fourth transformed input 252.

Depending on the configuration of the neural network 110, the sub-layer 130 can be configured to generate the layer output 272 in a variety of different ways, e.g., depending on whether the attention layer 110 is a reversible layer or not.

In the example of FIG. 2, the attention layer 110 is not a reversible layer, and the sub-layer 130 generates the layer output 272 by first applying a residual connection 260 to the fourth transformed input 252 to generate an initial output 262 and then applying layer normalization to the initial outputs 262 at the output positions to generate the layer outputs 272 at the output positions.

Figure 3:
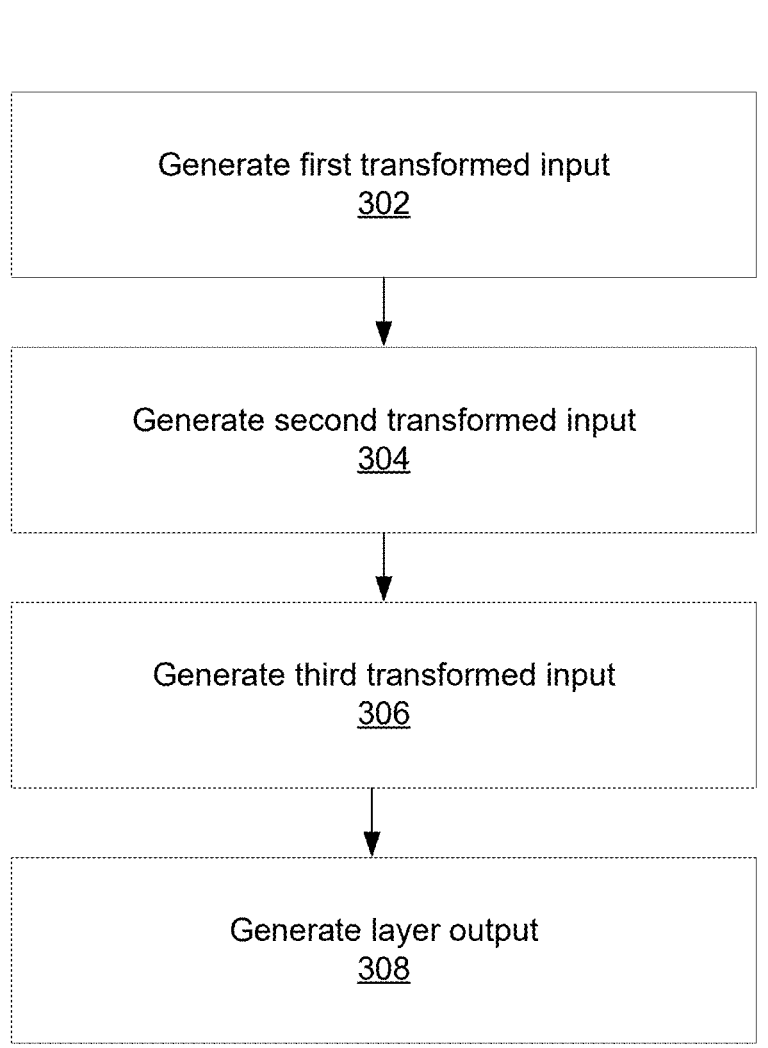
FIG. 3 is a flow diagram of an example process for generating an output sequence for an attention layer from an attended input sequence.

FIG. 3 is a flow diagram of an example process 300 for generating a layer output from an attended input sequence. For convenience, the process 300 will be described as being performed by a system of one or more computers located in one or more locations. For example, a neural network system, e.g., neural network system 100 of FIG. 1, appropriately programmed in accordance with this specification, can perform the process 300.

In general, the system receives, at a feed-forward sub-layer included in an attention layer, an attended input sequence that includes a respective attended input at each of one or more positions and generates, from the attended input sequence, an output sequence for the attention layer that includes a respective layer output at each of the one or more positions.

The attended input sequence was generated by an attention sub-layer within the attention layer that is configured to receive an input sequence for the attention layer that includes a respective layer input at each of the one or more positions and generate the attended input sequence at least in part by applying an attention mechanism to the input sequence for the layer.

The system generates, by the feed-forward sub-layer and for each of the positions, a first transformed input (step 302), at least in part by applying a first linear transformation to the attended layer input at the position.

The system generates, by the feed-forward sub-layer and for each of the positions, a second transformed input by applying a second linear transformation to the attended layer input at the position (step 304).

The system generates, by the feed-forward sub-layer and for each of the positions, a third transformed input by performing an element-wise multiplication between the first transformed input and the second transformed input (step 306).

The system generates, by the feed-forward sub-layer and for each of the positions, the layer output at the position from the third transformed input (step 308).

For each attention layer in the attention neural network, the system can repeatedly (i.e., at each of one or more attention sub-layers included in the attention layer) perform the process 300 to update the input sequence to the layer. By repeatedly performing the process 300 for all of the attention layers in the attention neural network and then by processing at least part of the output sequence generated by the last attention layer in the attention neural network using one or more output layers, the system can generate a network output for a received network input.

That is, the process 300 can be performed as part of predicting an output for an input for which the desired output, i.e., the output that should be generated by the system for the input sequence, is not known.

The process 300 can also be performed as part of processing inputs derived from a set of training data, i.e., inputs derived from a set of inputs for which the output that should be generated by the system is known, in order to train the attention neural network to determine trained values for the parameters of the attention neural network. The system can repeatedly perform the process 300 on inputs selected from a set of training data as part of a conventional machine learning training technique to train the attention layers and the output layer(s) of the neural network, e.g., a gradient descent with backpropagation training technique that uses a conventional optimizer, e.g., stochastic gradient descent, RMSprop, or Adam optimizer, to optimize an objective function that is appropriate for the task that the attention neural network is configured to perform. During training, the system can incorporate any number of techniques to improve the speed, the effectiveness, or both of the training process. For example, the system can use dropout, label smoothing, or both to reduce overfitting. As another example, the system can perform the training using a distributed architecture that trains multiple instances of the attention neural network in parallel. Moreover, the system can first pre-train the neural network on a large unsupervised data set through unsupervised learning, e.g., to minimize a BERT loss or other unsupervised loss, and then fine-tune the neural network on task-specific training data to optimize the objective function for the task.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising one or more computers and one or more storage devices storing instructions that, when executed by the one or more computers, cause the one or more computers to implement:

an attention neural network configured to process a network input to generate a network output for a machine learning task, the attention neural network comprising a plurality of attention layers, each attention layer comprising an attention sub-layer and a feed-forward sub-layer, the attention sub-layer configured to:

receive an input sequence for the attention layer comprising a respective layer input at each of one or more positions; and generate an attended input sequence at least in part by applying an attention mechanism to the input sequence for the attention layer, the attended input sequence comprising a respective attended layer input at each of the one or more positions, and the feed-forward sub-layer configured to:

receive the attended input sequence; and generate an output sequence for the attention layer from the attended input sequence, the output sequence comprising a respective layer output at each of the one or more positions, and the generating comprising, for each position of the one or more positions:

generating a first linear transformation output by applying a first linear transformation to the attended layer input at the position;

generating a first transformed input by applying a non-linear activation function to the first linear transformation output;

generating a second transformed input by applying a second linear transformation to the attended layer input at the position;

generating a third transformed input by performing an element-wise multiplication between the first transformed input and the second transformed input; and generating the layer output at the position based on the third transformed input, wherein the first and second linear transformations have been learned during training of the attention neural network to perform the machine learning task, the training of the attention neural network comprises training the attention neural network on an unsupervised data set through unsupervised learning, the same first linear transformation is applied to the attended layer inputs at each of the positions in the input sequence, the same second linear transformation is applied to the attended layer inputs at each of the positions in the input sequence, and the attention neural network further comprises one or more output layers that are configured to process at least one of the layer outputs in the output sequence generated by one of the plurality of attention layers to generate at least a portion of the network output for the machine learning task.

2. The system of claim 1, wherein the non-linear activation function is a Swish activation function.

3. The system of claim 1, wherein the non-linear activation function is a ReLu activation function.

4. The system of claim 1, wherein the non-linear activation function is a sigmoid activation function.

5. The system of claim 1, wherein the non-linear activation function is a Gaussian Error Linear Units activation function.

6. The system of claim 1, wherein applying the first linear transformation to the attended layer input at the position comprises:

multiplying the attended layer input by a first weight matrix to generate a first product.

7. The system of claim 1, wherein applying the second linear transformation to the attended layer input at the position comprises:

multiplying the attended layer input by a second weight matrix to generate a second product.

8. The system of claim 7, wherein weights in the first weight matrix have different values than weights in the second weight matrix.

9. The system of claim 1, wherein the attention mechanism comprises a multi-head self-attention mechanism.

10. The system of claim 1, wherein the machine learning task comprises one of:

a text generation task where the network output comprises a sequence of text; or an image generation task where the network output comprises a sequence of intensity values for pixels of an image.

11. A method performed by one or more computers, the method comprising:

receiving a network input; and processing the network input using an attention neural network to generate a network output for a machine learning task, the attention neural network comprising a plurality of layers, each layer comprising an attention sub-layer and a feed-forward sub-layer, the attention sub-layer configured to:

receive an input sequence for the attention layer comprising a respective layer input at each of one or more positions; and generate an attended input sequence at least in part by applying an attention mechanism to the input sequence for the attention layer, the attended input sequence comprising a respective attended layer input at each of the one or more positions, and the feed-forward sub-layer configured to:

receive the attended input sequence; and generate an output sequence for the attention layer from the attended input sequence, the output sequence comprising a respective layer output at each of the one or more positions, and the generating comprising, for each position of the one or more positions:

generating a first linear transformation output by applying a first linear transformation to the attended layer input at the position;

generating a first transformed input by applying a non-linear activation function to the first linear transformation output;

generating a second transformed input by applying a second linear transformation to the attended layer input at the position;

generating a third transformed input by performing an element-wise multiplication between the first transformed input and the second transformed input; and generating the layer output at the position based on the third transformed input, wherein the first and second linear transformations have been learned during training of the attention neural network to perform the machine learning task, the training of the attention neural network comprises training the attention neural network on an unsupervised data set through unsupervised learning, the same first linear transformation is applied to the attended layer inputs at each of the positions in the input sequence, the same second linear transformation is applied to the attended layer inputs at each of the positions in the input sequence, and the attention neural network further comprises one or more output layers that are configured to process at least one of the layer outputs in the output sequence generated by one of the plurality of attention layers to generate at least a portion of the network output for the machine learning task.

12. The method of claim 11, wherein the non-linear activation function is a Swish activation function.

13. The method of claim 11, wherein the non-linear activation function is a ReLu activation function.

14. The method of claim 11, wherein the non-linear activation function is a sigmoid activation function.

15. The method of claim 11, wherein the non-linear activation function is a Gaussian Error Linear Units activation function.

16. The method of claim 11, wherein applying the first linear transformation to the attended layer input at the position comprises:

multiplying the attended layer input by a first weight matrix to generate a first product.

17. The method of claim 11, wherein applying the second linear transformation to the attended layer input at the position comprises:

multiplying the attended layer input by a second weight matrix to generate a second product.

18. The method of claim 17, wherein weights in the first weight matrix have different values than weights in the second weight matrix.

19. The method of claim 11, wherein the attention mechanism comprises a multi-head self-attention mechanism.

20. The method of claim 11, wherein the machine learning task comprises one of:

a text generation task where the network output comprises a sequence of text; or an image generation task where the network output comprises a sequence of intensity values for pixels of an image.

21. One or more non-transitory computer storage media storing instructions that when executed by one or more computers cause the one or more computers to implement:

an attention neural network configured to process a network input to generate a network output for a machine learning task, the attention neural network comprising a plurality of attention layers, each attention layer comprising an attention sub-layer and a feed-forward sub-layer, the attention sub-layer configured to:

receive an input sequence for the attention layer comprising a respective layer input at each of one or more positions; and generate an attended input sequence at least in part by applying an attention mechanism to the input sequence for the attention layer, the attended input sequence comprising a respective attended layer input at each of the one or more positions, and the feed-forward sub-layer configured to:

receive the attended input sequence; and generate an output sequence for the attention layer from the attended input sequence, the output sequence comprising a respective layer output at each of the one or more positions, and the generating comprising, for each position of the one or more positions:

generating a first linear transformation output by applying a first linear transformation to the attended layer input at the position;

generating a first transformed input by applying a non-linear activation function to the first linear transformation output;

generating a second transformed input by applying a second linear transformation to the attended layer input at the position;

generating a third transformed input by performing an element-wise multiplication between the first transformed input and the second transformed input; and generating the layer output at the position based on the third transformed input, wherein the first and second linear transformations have been learned during training of the attention neural network to perform the machine learning task, the training of the attention neural network comprises training the attention neural network on an unsupervised data set through unsupervised learning, the same first linear transformation is applied to the attended layer inputs at each of the positions in the input sequence, the same second linear transformation is applied to the attended layer inputs at each of the positions in the input sequence, and the attention neural network further comprises one or more output layers that are configured to process at least one of the layer outputs in the output sequence generated by one of the plurality of attention layers to generate at least a portion of the network output for the machine learning task.

* * * * *